United States Patent [19]

Ebner et al.

[11] 3,993,875
[45] Nov. 23, 1976

[54] TONE RECEIVER

[75] Inventors: Theran L. Ebner; Donald W. Hawkins, both of Houston, Tex.

[73] Assignee: Houston Natural Gas Corporation, Houston, Tex.

[22] Filed: May 23, 1975

[21] Appl. No.: 580,277

[52] U.S. Cl. .............................. 179/84 VF; 179/2 A
[51] Int. Cl.² ......................................... H04M 1/50
[58] Field of Search ............... 179/84 VF, 2 R, 2 A; 324/78 D; 340/171 R, 171 A

[56] References Cited
UNITED STATES PATENTS

| 3,537,001 | 10/1970 | Friend | 179/84 VF |
| 3,760,269 | 9/1973 | Beeman | 324/78 D |
| 3,790,720 | 2/1974 | Schartmann | 179/84 VF |
| 3,912,869 | 10/1975 | Ullakko | 179/84 VF |
| 3,917,912 | 11/1975 | Niwa | 179/84 VF |

Primary Examiner—Kathleen H. Claffy
Assistant Examiner—Joseph A. Popek
Attorney, Agent, or Firm—Fulbright & Jaworski

[57] ABSTRACT

A tone receiver for connection to a telephone line at the station end for responding to a predetermined tone frequency in which the receiver has a multiple frequency selectable channel for allowing the receiver to respond to only one of a plurality of input tone frequencies. Circuit means are provided for comparing the input tone frequency with the output of the selected frequency for insuring that the receiver is responsive to only a predetermined input frequency. A programming circuit is provided for allowing the receiver to sample the input tone frequency only during a predetermined time interval. Storage means are connected to and actuate the receiver output when a predetermined number of comparisons have been counted between the input tone frequency and the selected frequency of the receiver.

10 Claims, 2 Drawing Figures

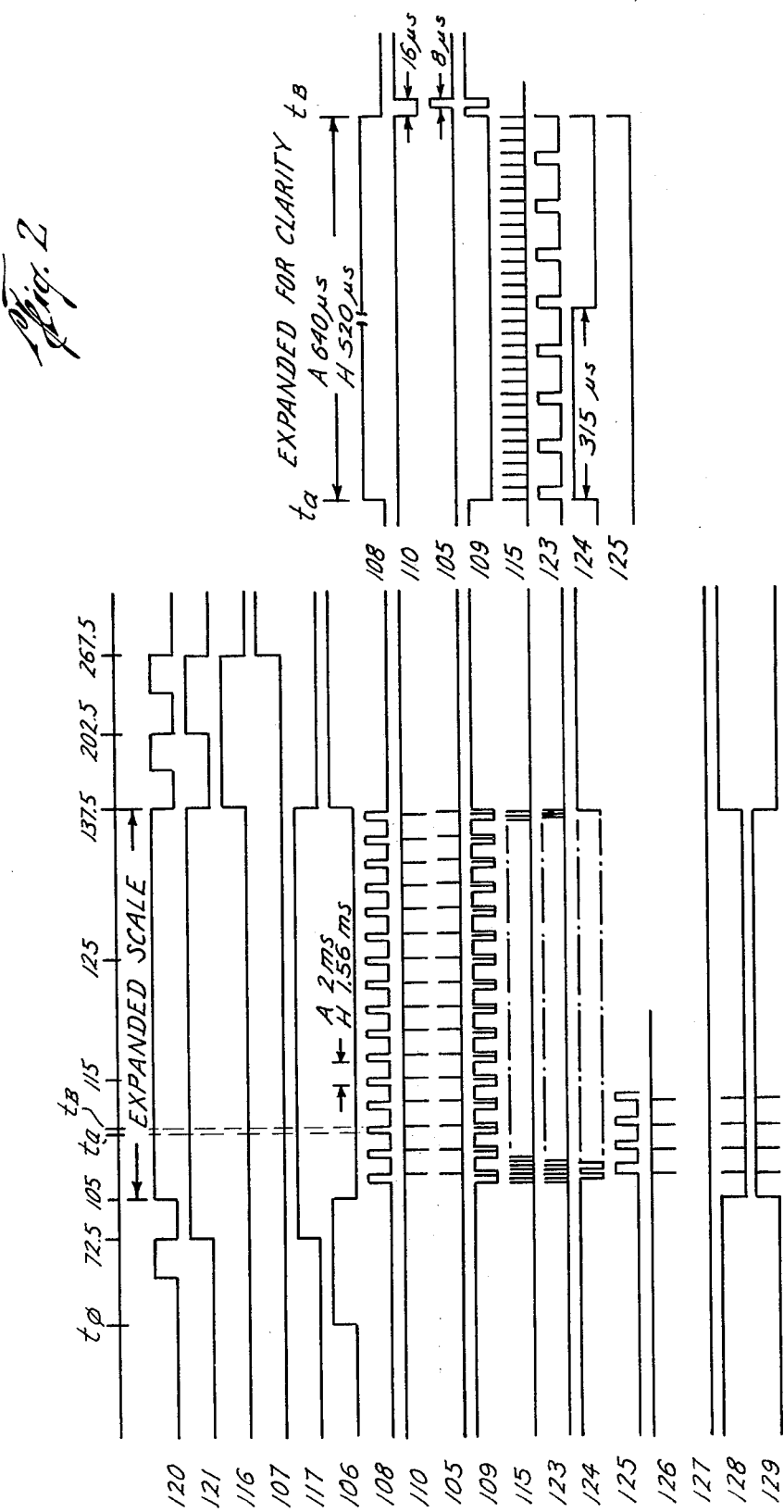

TONE RECEIVER

BACKGROUND OF THE INVENTION

Tone receivers are in use throughout the communications industry to fulfill a variety of signalling needs. Typically, they employ resonant electrical or electromechanical circuits to provide selectivity or multi-channel separation which must be critically adjusted during manufacture and carefully monitored in service to assure dependable operation. There are two basic categories of tone receivers. The first category is used for data reception. The second category includes the types typically used for supervisory control.

The present invention is of the second type and is intended for use on ordinary telephone subscriber lines to fulfill a need for supervisory control on the subscriber premises. While the present invention has application in numerous environments and for many purposes, it is specifically designed for use on multi-party telephone subscriber lines to allow selective activation of automatic residential utility meter reading transponders located at each subscriber residence for use in conjunction with an automatic meter reading transponder which is disclosed in copending U.S. Pat. applications Ser. No. 565,974, filed Apr. 7, 1975, entitled "Transponder for Transmitting Data from Digital Encoding Transducers over a Telephone Line".

The present tone receiver is provided to respond to only one of a plurality of tone frequencies by utilizing a digital method of responding to the one frequency. This is analogous to a very high Q tuned (L/C) circuit, but without the deficiencies normally exhibited by such circuits. For example, the channel bandwidth is essentially independent of the input signal amplitude. Since, in the present device, there are no resonant circuits in the receiver, the receiver is inherently stable.

In addition, typical multi-party telephone lines may include "bridge lifters" in series with each subscriber pair so that loading of an active line by idle lines is minimized. Bridge lifters are essentially saturable reactors placed in series with each subscriber pair which exhibit very high impedance to voice frequencies. Ordinarily, off-hook supervisory DC currents effectively saturate the cores of the bridge lifters sufficiently to drastically reduce their impedance to a level which does not impair voice communication over an active pair. Where outgoing (from central office to subscriber) voice band signals are involved, however, they severely attenuate the signals since there is no DC current flow in an on-hook line. Common practice, where signalling over such lines is required, is to use abnormally high level signals at the lower frequencies to overcome the attenuation. While this is an effective method, it has the disadvantage of increasing crosstalk to other pairs in the cable. Bandwidth, sensitivity, and the relationship between these two characteristics are important considerations in the design of a device to be connected to a subscriber telephone line. This is particularly important where the device is to be located at the subscriber end of the loop.

If the subscriber line is equipped with MF (multifrequency) type service, the device will be subjected to relatively high level audio signals and must not be falsely activated by signals originated at the station end. On the other hand, the device must respond to low level signals if it is to operate on the longest loops. False activating cannot be tolerated due to the interference it might cause. Similarly, the relatively high level signals it might receive on a short loop must not cause false activation. For those and other considerations, the present invention provides a device suitable for use in multi-party line environments.

SUMMARY

The present invention is directed to a tone receiver for connection to a telephone line at the station end for responding to a predetermined tone frequency in which a channel frequency selector circuit digitally responds to only one of a plurality of tone frequencies. The receiver is provided with a channel bandwidth which is essentially independent of variations in input signal amplitude.

Yet a still further object of the present invention is the provision of a tone receiver having a coincident detector circuit connected to the input and to the output of the channel frequency selector circuit for comparing the input tone frequency wih the output of the channel frequency selector circuit.

Still a further object of the present invention is the provision of a tone receiver having a programming circuit for allowing the receiver to sample the input tone frequency during a predetermined time interval. When a plurality of tone receivers are connected to a multi-party line, their programming circuits may be arranged to cause the various receivers to sample the input signal at different time intervals to reduce the number of shunted circuits.

Still a further object of the present invention is the provision of a tone receiver having storage means connected to the output of the coincidence detector circuit for counting a predetermined number of times coincidence between the input tone frequencies and the output of the channel frequency selector occurs during the predetermined time interval and which in turn enables a relay driver circuit when a predetermined count of coincidence has occurred.

Still a further object of the present invention is the provision wherein the timing signals provided to the channel frequency selector, the coincidence detector and the programming circuit are digitally derived from a common clock circuit using a piezo-electric type ceramic filter oscillator to assure stability and accuracy of the timing signals.

Yet a still further object of the present invention is the provision of a tone receiver in which the channel frequency selector circuit is adjustable to provide one of a plurality of designated tone frequencies whereby a plurality of tone receivers may be connected to a multi-party telephone line and each can be adjusted to respond to only one of a plurality of input tone frequencies.

Yet a further object of the present invention is the provision of a tone receiver having a programming circuit which is adjustable to vary the predetermined time interval in which the receiver is allowed to sample the input tone frequency whereby when a plurality of tone receivers are connected to a multi-party line the tone receivers can be adjusted to sample the input tone frequency at designated time intervals.

Yet a still further object of the present invention is the provision of a tone receiver in which the coincidence detector circuit is synchronized with the predetermined time interval of the programming circuit to insure that the coincidence pulses are positioned in time at the proper point to insure that the input tone frequencies directed to the tone receiver will be recognized.

Other and further features and advantages will be readily apparent from the following description of a preferred embodiment.

DESCRIPTION OF THE DRAWINGS

FIG. 2 is a timing diagram of various signals occurring in the apparatus of FIG. 1.

DESCRIPTION OF THE PREFERRED EMBODIMENT

Figure 1:
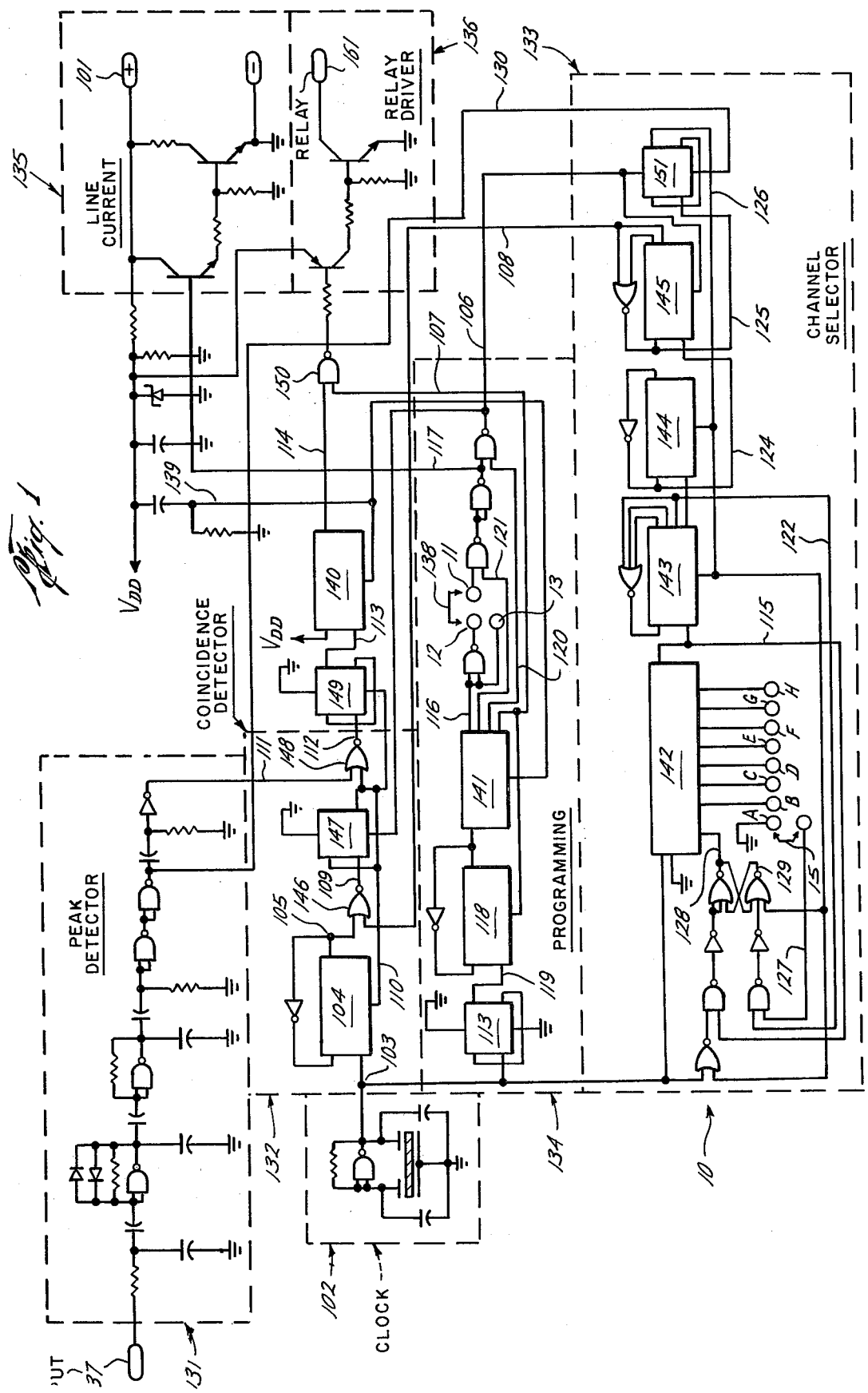
FIG. 1 is an electrical logic schematic of the present invention.

While the present invention has numerous applications, it will be described for use in conjunction with an automatic residential utility meter reading transponder such as disclosed in copending patent application entitled "Transponder for Transmitting Data from Digital Encoding Transducers over a Telephone Line," Ser. No. 565,974, filed Apr. 7, 1975, which is designed for use on single party lines.

The present invention is intended as an addition to the transponder to adapt the transponder for use on multi-party lines. For example, one of the present tone receivers may be connected to each of an eight-party line having subscribers A, B, C, D, E, F, G and H in which each of the tone receivers responds to only one of a plurality of supervisory control input tone frequencies as follows:

| Subscriber | Corresponding Alert Frequency |
| --- | --- |
| A | 520.6 Hz |
| B | 533.9 Hz |
| C | 548.0 Hz |
| D | 562.8 Hz |
| E | 578.4 Hz |
| F | 595.0 Hz |
| G | 612.4 Hz |
| H | 631.0 Hz |

Referring now to FIG. 1, the tone receiver of the present invention is generally indicated by the reference numeral 10 and generally includes:

A conventional piezo-electric clock oscillator 102 which provides timing signals for receiver 10. The output frequency of clock 102 is chosen to be substantially higher than the tone channel frequencies, for example 502.5 KHZ, so that normal variations in the clock frequency have an insignificant effect upon channel frequency response. Channel frequency response accuracy is enhanced by digitally dividing the timing signals down to them so that adjustment at manufacture is not required.

A peak detector circuit 131 which differentiates the input tone frequency signal 137 and delivers a narrow negative going pulse 111 for each input cycle.

A coincidence detector circuit 132 which produces a sampling and coincidence pulse 110 and count coincidence with the peak detector pulses 111.

A channel selector circuit 133 which programs the position of the coincidence pulse 110 in the time domain at the proper interval for the selected channel. For example, if the tone reciever 10 connected to subscriber A is to be actuated, coincidence pulses 110 are produced at (1/520.6) second intervals. Signal 130 from detector circuit 131 synchronizes circuit 133 to establish a phase lock between the input tone frequency 137 and coincidence pulses 110.

A programming circuit 134 is provided for the tone receiver 10. It may be strapped by strap 138 across terminals 11 and 12 to cause the receiver to sample the input signal 137 for 32.5 Ms either 105 or 235 Ms after power is applied to the unit. The sampling interval is accompanied by an increase in line current to reduce the effects of bridge lifters. A telephone line current circuit 135 provides this function.

A relay driver circuit 136 is provided. Assuming that the receiver 10 has received the proper input activating tone, signal 114 enables the circuit 136 during the 32.5 Ms sampling interval. Signal 107 from the programming circuit 134 completes the activating sequence by turning the enabled circuit 136 on.

Assume for exemplary purposes that the receiver 10 is connected to the transponder disclosed in copending U.S. Pat. application Ser. No. 565,974 and that the assembly is connected to a typical telephone subscriber line. Assume further that the transponder is in a pre-alerted condition so that power has just been applied to power line 101 and a 520.6 Hz input tone frequency for activating the receiver 10 connected to subscriber A is present at line input 137. These conditions correspond to $t\phi$ on the timing diagram on FIG. 2.

When power is applied to line 101, a reset pulse 139 resets counter 140 and counter 141.

Clock signal 103, which for example is assumed to be 502.5 Khz, starts programming circuit 134 counting through line 103. Circuit 134 counts through FLIP-FLOP 113 and divide by eight counters 118 and 141 until signals 121 and 120 are both high and signal 116 from counter 141 is low at t105. Signal 117 switches high at this time. Signal 117 high turns line current circuit 135 on, causing an increase in telephone line current which reduces bridge lifter attenuation to signal 137. The increased line current simulates the off-hook condition which would occur when the subscriber is about to place a call.

Signal 106 from circuit 134 switches low at t105. Signal 106 low removes the inhibit signal from FLIP-FLOP 151 in the frequency selector circuit 133. FLIP-FLOP 151 is in the preset condition at this time so that signal 126 therefrom is high.

Signal 126 high inhibits channel selector circuit 133 from responding to clock pulses 103 by holding signal 128 to count by 10 counter 142 high. t105, Peak detector circuit 131 has been generating pulses each time input signal 137 reaches peak value. Signal 106 from the programming circuit 134, in the interval from $t\phi$ until t105, has inhibited circuits 132 and 133 from responding to input signals 111 and 130 respectively. To establish a convenient point in time reference, assume that signal 130 pulses high immediately after t105.

Signal 130 pulses high resets signal 126 low. Signal 126 low enables channel selector circuit 133 which begins to count clock pulses 103. Signal 128 is forced low at the first negative transition of signal 103 after signal 126 switched low. The next positive transition of signal 103 is counted by counter 142.

Counter 142 continues to count until it reaches a count of 10 where signal 115 switches high and advances divide by four counter 143 to a count of 1.

Counters 142 and 143 are so connected as to function as a dividing circuit which may be strapped by strap 15 to divide by a factor of 33, 34, 35, 36, 37, 38, 39, or 40. The various ratios are selected by strapping line 127 to B, C, D, E, F, G, H, A, respectively. For purposes of exemplary discussion, 127 is assumed to be connected by strap 15 to A which is subscriber A for a division ratio of 40.

Counter 142 continues to count and advance counter 143 until a total of 40 pulses have been counted where signal 123 switches high and advances divide by 8 counter 144 to a count of 1. The described action continues until counter 144 reaches a count of 8 where 124 switches high and advances divide by three counter 145.

Counter 145 continues to be advanced until it reaches a count of 3 where signal 108 therefrom switches high. The point in time where 108 switches high is $(1/502500) \times 40 \times 8 \times 2 = 1.2736$ Ms. Signal 108 remains high until divide by 3 counter 145 receives the next 126 pulse at $(1/502500) \times 40 \times 8 \times 3 = 1.91$ Ms. The 108 high pulse is therefore 0.636 Ms long. The described action continues so that signal 108 is pulsed high for 0.636 Ms each 1.27 Ms.

At the end of each 108 pulse, when 108 switches low, NOR gate 146 in the coincidence detector circuit 132 is enabled. Counter 104 is a divide by 8 counter. It is inhibited from responding to clock pulses 103 by signal 110 in the high condition. Signal 105 is normally low. At the trailing edge of each 108 pulse, where 108 switches low enabling gate 146, signal 109 switches high, causing FLIP-FLOP 147 to switch to the set condition. FLIP-FLOP 147 set switches 110 low, enabling counter 104 to count clock pulses 103. Counter 104 counts 8 pulses and switches signal 105 high. Signal 105 high switches 109 low. Counter 104 counts to a count of 8 a second time and switches 105 low. Signal 105 and 108 are once again both low, causing 109 to switch high. Signal 109 switching high switches 147 to the reset condition where signal 110 is high. Signal 110 switching high stops counter 104.

The described action of counter 104 and FLIP-FLOP 147 has resulted in a low 110 pulse which enables NOR gate 148 for an interval of $(1/502500) \times 8 = 16$ us.

Reviewing for a moment, a peak detector pulse 130 causes channel selector circuit 133 to produce a 108 signal. The trailing edge of 108 produces a coincidence enabling pulse 110. The enabling pulse begins at 1.91 Ms and extends to 1.926 Ms with respect to signal 103.

Recalling now that signal 137 was assumed to be a 520.6 Hz tone which is differentiated by circuit 131 to produce a peak pulse each cycle or (1/520.6) second, it can be seen that signal 111 will be pulsed low each 1.921 Ms.

Therefore, signal 111 low coincides within the enabled interval of NOR gate 148 and causes signal 112 to be pulsed high.

Signal 112 pulsed high switches FLIP-FLOP 149 which in turn switches eight count counter 140. When eight 112 pulses have occurred, signal 114 switches high to enable NAND gate 150. The coincident sampling process continues for 32.5 Ms when signal 106, from the programming circuit, switches high.

Signal 106 high resets FLIP-FLOP 147 which stops detector circuit 132. Signal 106 high also presets FLIP-FLOP 151 causing 126 to switch high. Signal 126 high stops channel selector circuit 133.

We have presently reached $t137.5$ in our exemplary sequence. Due to the fact that signal 137 is the frequency which 127, in the channel frequency selector circuit 133, is strapped by strap 15 to enable recognition of, NAND gate 150 was enabled in the interval $t105$ and $t137.5$ to actuate relay 161 and the transponder circuit of the above mentioned copending application.

The sample interval from $t105 - t137.5$ is positioned in the time domain by strap connection 138 in the programming circuit 134 which may be optionally connected to terminal 13 instead of terminal 12 as shown. When so connected, the sampling interval will occur in the time interval $t235 - t267.5$.

This feature, the adjustability of selecting the sampling interval, of the tone receiver is highly advantageous in practice where the multi-party line loop complex consists of very short and very long loops in combination. For example, if we assume that eight receivers 10 are connected to the multi-party loop complex sample and receive an activating tone at the same time, and that a component of the sampling interval is an increase in DC current flow to each receiver 10 in order to overcome the attenuating effects of their respective bridge lifters, we incur two undesirable effects. The first effect to be considered is unnecessary attenuation of the alerting tone due to the shunting effect of the seven receivers which ultimately will not respond to the tone. The second effect to be considered is the DC power requirement and the reduction of power available to the device connected to the longest loop in the loop complex by the effects of the devices connected to the shorter loops.

Strap connection 138 may be used to divide the eight receivers 10 into two groups, one group of four being programmed to sample at $t105 - t137$ and the other group of four at $t235 - t267.5$. That is, four of the receivers will be strapped to terminal 12 and the other four receivers will be strapped to terminal 13. During either sampling interval, a given receiver 10 input therefore is shunted by only three other receivers and their respective loops. The effect of the other four loops in the loop complex is minimized by their respective bridge lifters.

The dynamic range of loop characteristics on which the devices may be used is significantly improved by the time division multiplexing afforded by the proper use of the strapping connection 138.

Returning now to our exemplary sequence, programming circuit 134 continues to count clock pulses 103 until counter 141 reaches a count of $2^{14}$ and signal 107 switches high. Signal 107 high occurs at $t267.5$ and stops circuit 134. Signal 107 high also causes NAND gate 150 to turn relay driver circuit 136 on. NAND gate 150 responds to signal 107 due to the fact that signal 114 is high as previously discussed.

It is clear that a signal 137 frequency other than the one which 127 is strapped for will not result in the required 8-peak pulse/signal 110 coincidences during the $t105-t137.5$ interval. Under these conditions, signal 114 will remain low and NAND gate 150 cannot respond to signal 107 when it occurs.

Similarly, it is noted that line 127 may be connected to any one of seven other connections by strap 15, each of which enables the tone receiver 10 to respond to a different signal 137 frequency.

For example in the case of subscriber B, 127 may be connected to B which will program channel frequency selector circuit 133 to generate a 108 signal at $(1/502500) \times 33 \times 8 \times 3 = 1.576$ Ms intervals. Signal 110 will enable NOR gate 148 as before so that 149 can respond to 112 pulses resulting from 111 signals occurring at a repetition rate within the range 1.576 – 1.592 Ms. The receiver 10 would then respond to signal 137 frequencies ranging from 628 – 634 Hz, with 631 Hz being the nominal.

The present invention, therefore, is well adapted to carry out the objects and attain the ends and advantages mentioned as well as others inherent therein. While a presently preferred embodiment of the invention is given for the purpose of disclosure, numerous changes in the details of construction and arrangement of parts will readily suggest themselves to those skilled in the art and which are encompassed within the spirit of the invention and the scope of the appended claims.

What is claimed is:

1. A tone receiver for connection to a telephone line at the station end for responding to a predetermined tone frequency comprising,
    an input adapted to be connected to the telephone line for receiving said predetermined tone frequency, including means generating a synchronizing pulse at the same point on each input tone frequency cycle,
    channel frequency selector circuit means connected to the input for allowing the receiver to respond to only one of a plurality of tone frequencies,
    coincidence detector circuit means connected to the input and to the output of the channel frequency selector circuit for registering coincidence in time with the synchronizing pulse of input tone frequency and the output of the channel frequency selector circuit,
    programming circuit means having an output connected to the coincidence detector circuit for allowing the receiver to sample the input tone frequency during a predetermined time interval,
    storage means connectecd to the output of the coincidence detector circuit means for counting a predetermined number of times coincidence between the input tone frequency and the output of the channel frequency selector circuit occurs during the predetermined time interval,
    means connected to the output of the storage means which is enabled by the storage means when a predetermined count of coincidence between the input tone frequency and the output of the channel frequency selector circuit has occurred,
    clock means connected to the channel frequency selector circuit, the coincidence detector circuit, and the programming circuit for providing timing signals.

2. The apparatus of claim 1 wherein the channel frequency selector circuit is adjustable to provide one of a plurality of designated tone frequencies.

3. The apparatus of claim 1 wherein the programming circuit is adjustable to vary the predetermined time interval.

4. The apparatus of claim 1 wherein the clock means is a piezo-electric ceramic filter oscillator.

5. The apparatus of claim 1 wherein the channel frequency selector circuit includes a counter circuit for dividing the timing pulses by an integral number.

6. The apparatus of claim 1 wherein the coincidence detector circuit includes a counter circuit for dividing the timing pulses by an integral number.

7. The apparatus of claim 5 wherein the division is synchronized by a signal to the channel selector circuit from the input tone frequency.

8. The apparatus of claim 6 wherein the coincidence detector circuit is synchronized with the predetermined time interval of the programming circuit.

9. The apparatus of claim 1 including a telephone line current circuit connected to the programming circuit for causing an increase in line current for reducing attenuation in any bridge lifter in the telephone circuit.

10. A plurality of tone receivers for connection to a multi-party telephone line in which one of the receivers is connected at the station end of each of the party telephones for responding to only a predetermined tone frequency, each of the receivers comprising,
    an input adapted to be connected to the telephone line having a peak detector circuit for detecting the peak voltage of input tone frequencies,
    channel frequency selector circuit means connected to the input for allowing the receiver to respond to only one of a plurality of input tone frequencies,
    coincidence detector circuit means connected to the input and to the output of the channel frequency selector circuit for registering coincidence in time with the peak voltage of one input tone frequency and the output of the channel frequency selector circuit,
    programming circuit means having an output connected to the coincidence detector circuit for allowing the receiver to sample the input tone during one of two predetermined time intervals,
    storage means connected to the output of the coincidence detector circuit means for counting a predetermined number of times coincidence between the one input tone frequency and the output of the channel frequency selector circuit occurs during the one predetermined time interval,
    relay driver circuit means connected to the output of the storage means when a predetermined count of coincidence between the input tone frequency and the output of the channel frequency selector circuit has occurred, and
    clock means connected to the channel frequency selector circuit, the coincidence detector circuit, and the programming circuit for providing timing signals.

* * * * *